United States Patent

[11] 3,617,070

[72] Inventor Arthur C. Roberts
4274 Griffin Creek Road, Medford, Oreg. 97501
[21] Appl. No. 15,361
[22] Filed Mar. 2, 1970
[45] Patented Nov. 2, 1971

[54] AMPHIBIOUS, STEERABLE, GLIDING VEHICLE
10 Claims, 7 Drawing Figs.

[52] U.S. Cl. .................................................... 280/21,
9/310, 280/24, 280/28
[51] Int. Cl. ...................................................... B62b 13/04
[50] Field of Search ............................................ 280/24, 25,
18, 19, 12, 21, 193, 28; 9/310 B, 310 C; 180/14.5;
297/209, 208

[56] References Cited
UNITED STATES PATENTS

| | | | |
|---|---|---|---|
| 3,082,443 | 3/1963 | Kimura | 9/310 B |
| 2,735,115 | 2/1956 | Dees | 9/310 B |
| 3,064,286 | 11/1962 | Hammond | 9/310 B |
| 3,190,668 | 6/1965 | Husak | 280/25 |
| 3,325,179 | 6/1967 | Bissett | 280/25 |
| 2,958,875 | 11/1960 | McClain | 9/310 B |
| 2,550,813 | 5/1951 | Hopkins | 180/14.5 |
| 3,450,413 | 6/1969 | Brenter | 280/16 |

Primary Examiner—Benjamin Hersh
Assistant Examiner—Robert R. Song
Attorney—Clarence M. Crews ABSTRACT: A single-rider gliding vehicle is provided, operable by gravity on snow-covered slopes, and by a towrope on the water, and steerable in either case by tilting and/or jerking of the vehicle body to the right or left. All surface portions of the vehicle body to the right or left. All surface portions of the vehicle are desirably composed of a hard, smooth, abrasion-proof material such as fiber-glass-reinforced polyester, but a body of flotation material such s styrofoam is enclosed in the floor portion in sufficient quantity to assure that the vehicle will float when separated in the water from the rider. Parallel, projecting, longitudinally extending runners are provided on the bottom of the vehicle for snow-steering control. The vehicle includes a seat assembly which comprises a tow latch, maintained effective by the weight of a rider on the seat, but automatically rendered ineffective when the rider relieves the seat of a critical portion, at least, of his weight. A cross brace or reinforcing unit extends across the body and provides handholds at opposite sides of the seat which are useful for steering, for detaching a towrope for carrying the vehicle, for giving the rider a firm hold on the vehicle, and for braking.

PATENTED NOV 2 1971 3,617,070
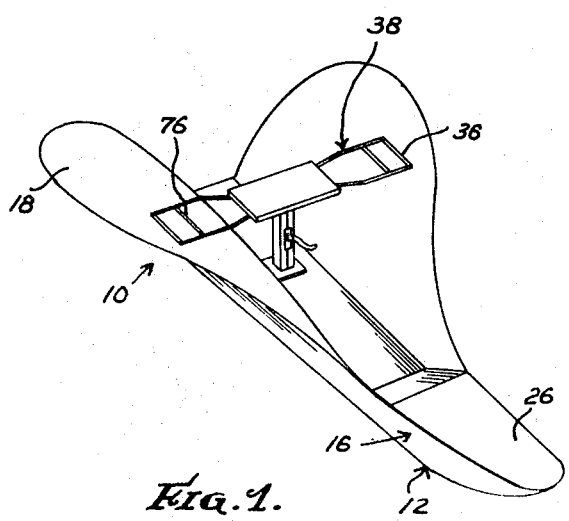
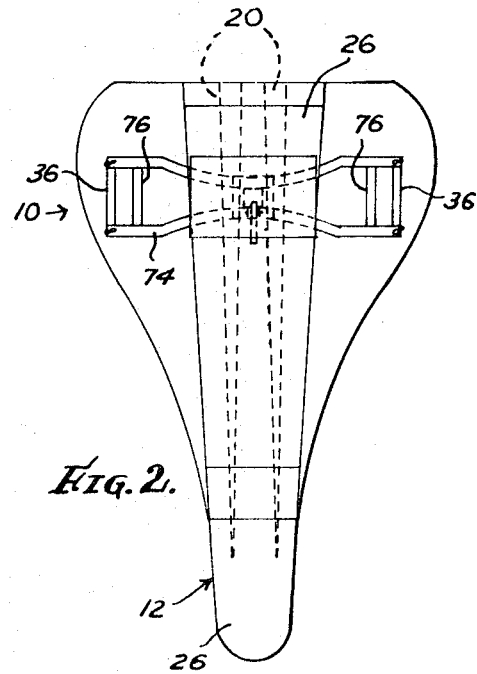
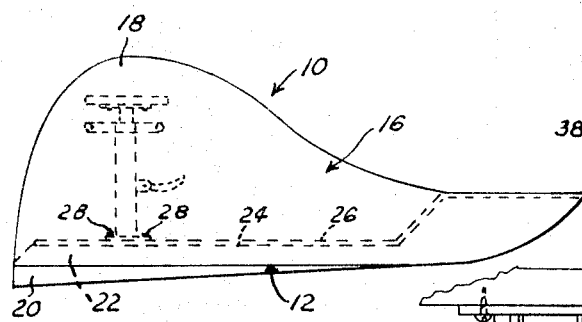
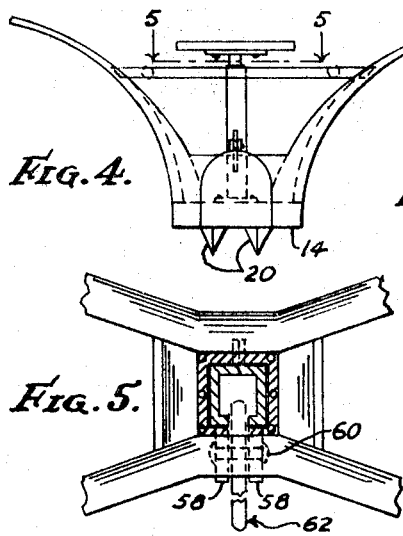
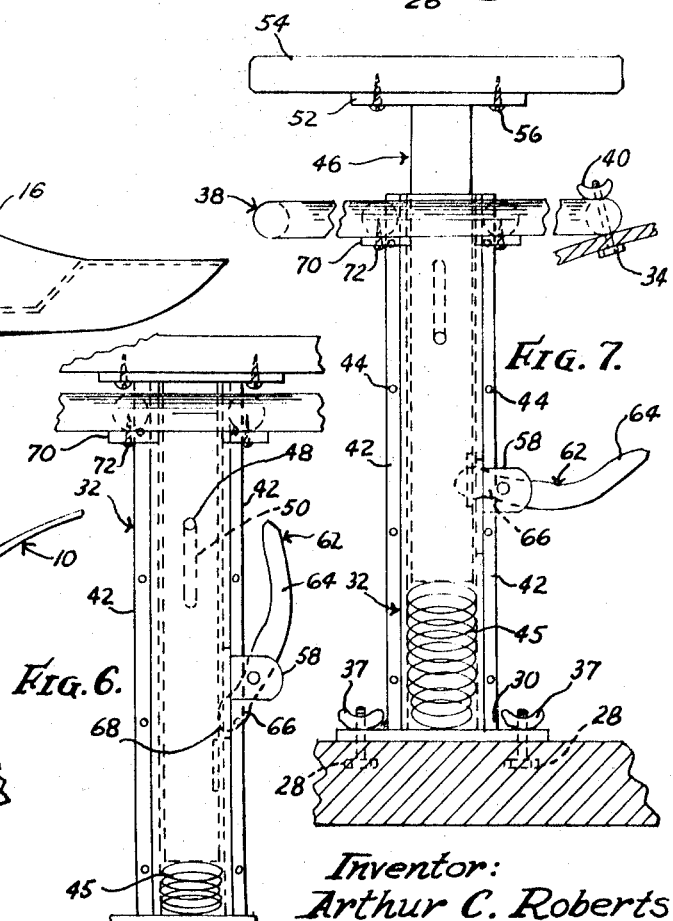
Inventor:
Arthur C. Roberts
by: *Clarence M Crews*
his attorney

AMPHIBIOUS, STEERABLE, GLIDING VEHICLE

This invention relates to recreational equipment, and more particularly to a single-rider gliding vehicle which can be used on snow-covered slopes in winter and on the water in summer, and which can, when used in either way, be steered by the tilting or jerking of the vehicle body. The fact that the vehicle is steerable on either land or water results in part, on the water, from a favorable body contour and in part, on the snow, from the fact that a plurality of parallel, projecting runners, desirably integral with the body, and having lateral faces of substantial area, are provided on the lower face of the body.

It is important that (1) the vehicle be made compact and light so that it can be conveniently picked up and carried, say on a ski lift; (2) that it be tough and abrasionproof; and (3) that it be made to consist of few and simple parts, involving little labor cost in its fabrication and assembly. To these ends, it is a feature that the body, including the runners, is a unitary structure whose exterior portions are molded of fiber-glass-reinforced polyester.

A further feature of the invention has to do with a seat assembly and an associated reinforcing unit or cross brace. The reinforcing unit is disposed crosswise of the body just below the seat and includes handholds at opposite sides of the seat.

It is still a further feature, useful alike in an amphibious vehicle or in a water vehicle, that the seat assembly includes a single tow latch which is maintained in effective position so long as the weight of the rider is borne by the seat, but is automatically shifted to a tow-releasing position in response to relief of weight on the seat. In this connection handholds, which form parts of the cross brace, provide a convenient means for enabling the rider to take his weight off the seat or at least to reduce the weight on the seat below a critical value without raising his body substantially, and hence without creating an unstable condition which might cause the vehicle to overturn or might cause the rider to be pitched out with or without overturning of the vehicle.

The handholds are useful also for steering the vehicle, for carrying it, and for jerking it sharply through a substantial angle to brake the forward motion of the vehicle in an emergency.

It is a still further feature that the vehicle body is so flared from bottom to top that the bodies of several vehicles may be stacked in nested relation for compact shipping and storing before the seat and reinforcing assembly have been applied, and that such assembly is made readily attachable to the body unit so that there is no need to apply it at the factory.

The versatility of the vehicle, enabling it to be used on either water or snow, is a very attractive feature. It is brought about, in part at least, by providing external runners which make it steerable in either water or snow, in combination with a buoyant floorspace filler which reinforces the floor and makes the entire vehicle floatable.

Other objects and advantages will hereinafter appear.

In the drawing forming part of this specification,

FIG. 1 is a perspective view of a practical and advantageous form of amphibious vehicle which includes features of the invention, and constitutes a presently preferred embodiment thereof;

FIG. 2 is a plan view of the vehicle of FIG. 1;

FIG. 3 is a view in side elevation of the vehicle showing in broken lines the normal relation of the seat to the post and the brace unit;

FIG. 4 is a view in front elevation of the unoccupied vehicle;

FIG. 5 is a fragmentary, sectional view taken upon the line 5—5 of FIG. 4, looking in the direction of the arrows, but upon a substantially larger scale than FIG. 4;

FIG. 6 is a fragmentary view in side elevation, partly broken away, showing the relation on the seat, when occupied, to the associated parts, and the tow latch in raised, tow-retaining position; and FIG. 7 is a view similar to FIG. 6 but showing the seat raised and the tow latch in tow-releasing position.

The novel amphibious, gliding vehicle 10 comprises a main body part 12 of fiber-glass-reinforced polyester which desirably has a thickness of the order of one-eighth inch. The body part 12 includes a generally flat bottom 14 which flares from front to rear and which is curved upward at its forward end so that the forward motion of the vehicle will tend to raise the vehicle to or toward the surface of the snow or water, as the case may be, and to retain it there. This tendency is promoted also by the fact that the weight is concentrated at the rear of the vehicle so that the bottom of the vehicle is normally slanted upward from rear to front.

Side portions 16 of the body flare upward and outward, and terminate in wing portions 18, the spread of the wing portions at and near the rear of the vehicle greatly exceeding the width of the body at the forward end thereof.

The bottom includes two protruding, spaced, parallel runners 20 which increase progressively and evenly in breadth and depth from front to rear. As shown, the sides of each runner meet at an angle of about 60°. The runners may desirably have a base width of 2 inches each and a depth of 1.73 inches at their rear ends, but fade away to nothing at their extreme forward ends.

The floorspace of the vehicle is filled with a block 22 of flotation material, such as styrofoam, the block being relatively thick at its forward end but much thinner throughout the major portion of its length. The contour of the upper surface of the block is substantially indicated by the broken line 24 of FIG. 3. The block 22 is not substantial enough to serve either as a tread surface or as a useful reinforcement for the runners 20. The filler block is therefore covered by a fiber-glass-reinforced polyester cover 26, which is made essentially integral with the body part 12, and which desirably has a thickness of the order of one-eighth inch. The block 22 may be formed to fit within, and to fill, the hollow runners 20, but since it would contribute little in the way of reinforcement to the runners, the runners are preferably left hollow.

The bodies are desirably shipped from the factory in nested formation and in the condition thus far described, with two exceptions. Bolts 28 have their heads fixed in the floor material, and their shanks exposed to fit through flanges 30 of a hollow seat-supporting post 32. Bolts 34 also have their heads fixed in thickened portions of the body wings 18 and their upstanding shanks disposed to pass upward through end members 36 of a cross brace of reinforcing unit 38. The entire body as described in a unitary structure.

The structure now to be described is made up as a unitary assembly for application, by means of wingnuts 37 and 40, to the bottom and to the wings 18, respectively, of the body.

The post 32 is rectangular, preferably square, in internal cross section, and is closed at the bottom. It is made up of complementary right and left members, each having front and rear vertical flanges 42 through which the post members are united to one another, as by rivets 44. A compression coil spring 45, lodged in the lower end of the post, bears upward against the lower end of a seat stem 46. The stem 46 fits slidingly in the post, and is held against rotary movement by the post. A pin 48, fixed in the opposite post members, as by having its ends upset, fits through a slot 50 of the stem and limits upward movement of the stem. The stem 46 is formed with a flange 52 at its upper end, to which a seat 54 for the rider is securely and fixedly attached by suitable means, such as screws 56.

Spaced ears 58, desirably integral with the respective post members, project forward from the post 32 and carry a pivot pin 60 on which a tow latch 62 is mounted. The latch 62 is disposed between the ears 58 and extends through a slot into the post 32. The latch has a bent outer arm 64 which serves as a tow retainer when in the raised position illustrated in FIG. 6, but which normally occupies the inactive position in which it is shown in FIG. 7. When the latter position, a tail portion 66 of the latch occupies a slot or recess 68 of the seat stem 46, the upward thrust of the spring 45 serving to keep the latch 62 fully projected.

When the rider is ready to use the vehicle in the water, he will first straddle the narrow portion of the vehicle while holding the towrope in one hand. Having passed a loop of the towrope around the latch, he will then squat down, putting enough pressure on the seat to depress the seat stem relative to the post, thereby to cam the tail 66 of the latch 62 out of the stem slot 68 and to raise the exposed portion 64 of the latch to the tow-retaining position in which it is shown in FIG. 6. He will then signal the pilot of the power-operated towing boat to proceed. If, as is likely, the towed vehicle is entirely submerged by the weight of the rider, it will, because of its contour and inclination, be drawn quickly to the surface of the water and will be retained there.

It should be noted that the weight of the rider is required only to compress the spring 45, and that in doing so it depresses the seat stem and thereby cams the tail of the latch into position to bear against a vertical face of the seat stem. The latch has not tendency, therefore, to raise the seat during use of the vehicle, and the rider, regardless of his weight, will not feel a variable lift imparted to the seat, as distinguished from the vehicle as a whole, as the speed in increased and diminished and the pull on the towrope is varied.

The sections of the post 32 are desirably formed, in a common plane at their upper ends, with horizontal flanges 70. These flanges extend beneath central portions of the cross brace or reinforcing unit 38 and are affixed to the cross brace by suitable fasteners such as screws 72. The cross brace comprises transverse members 74, end members 36 and handle members 76. It is desirably composed of light, nonrustably metallic tubing, such as aluminum or a magnesium-aluminum alloy. The post, seat and cross brace assembly constitutes a single composite unit which can be quickly and simply affixed to the vehicle body by means of the wingnuts 37 and 40. The wingnuts 37 and 40 may be threaded loosely onto the volts 28 and 34, respectively, at the factory, so that the assembly of the seat and cross brace unit with the body unit requires only the removal of the wingnuts, the setting of the seat and brace unit in place, and the reapplication of the wingnuts.

It will be noted that the post 32 forms with the cross brace a rigid, T-shaped structure so that both wings 18 of the vehicle body are not only rigidly connected to one another, but to the thickened and reinforced floor of the body. This dependably fixes the shape of the body, which body is strong and tough, but would, without the bracing, be objectionally deformable under the strains to which it is subjected in use.

The handhold members 76 are desirably located at opposite sides of the seat, as far out from the seat, say about 5 inches, as space permits. As already noted, these handholds are important (1) for carrying the vehicle, (2) for giving the rider a firm hold on the vehicle, (3) for steering the vehicle; (4) for releasing the tow latch, and (5) for braking in the snow.

While specific relationships and dimensions can be varied widely within the scope of the invention, the vehicle illustratively shown and described herein has a length of 4 feet, a height of 18 inches, and a wing spread of 3 feet. The seat surface is 15 inches above the normal bottom surface of the vehicle body, and the generally flat bottom increases in width from 6 inches near the leading end to 12 inches at the trailing end.

The tapering width and depth of the runners, and the tapering width of the bottom, sides and wings of the body all tend to point the vehicle in the direction in which the propelling force is acting, giving inherent stability to the vehicle. A tilting of the vehicle will, however, tend to deflect the vehicle from its course, enabling it to be caused to turn on snow or to weave in the water.

The management of the vehicle requires alertness and skill, but not so much skill as is required for the management of snow skies or water skies.

This is the only gliding vehicle, so far a s I know, which is serviceable on either snow or water.

I have described what I believe to be the best embodiment of my invention.

I claim:

1. A single-rider, steerable, combined snow and water gliding vehicle having, in combination, a light substantial strong body formed with a generally smooth, abrasion-resistant bottom which includes, for snow steering and braking purposes, a plurality of abruptly protruding, lengthwise extending, parallel runners, each of a substantial lateral area, the vehicle including within the body a filler of buoyant material sufficient in quantity to assure that the unoccupied vehicle will float freely under all circumstances, and a single raised seat in the rear portion of the body, the body having a relatively narrow, generally flat bottom and including for water stabilization and steering purposes, a pair of side wings each abruptly rising from the side of said flat bottom and flaring progressively and increasingly outward as they rise, each wing being at least comparable in height and in width with the width of the generally flat undersurface of the bottom.

2. A single-rider, steerable, combined snow and water vehicle as set forth in claim 1 in which the bottom of the body increases progressively in width from front to rear.

3. A single-rider steerable, combined snow and water vehicle as set forth in claim 2 in which the runners increase smoothly in depth and width from front to rear for the purpose of promoting longitudinal stability and controllable steering when coasting down a snow slope, the runners being hollow and being integral parts of the body.

4. A single-rider, steerable, combined snow and water vehicle as set forth in claim 1 in which, for water towing and steering purposes, a single tow latch is provided centrally of the vehicle, single-rider, tow latch being located, longitudinally of the vehicle, near to the center of keel plane area of the vehicle, and at a sufficiently raised level relative to the forward extremity of the vehicle body to assure clearance of said forward extremity by a towrope secured to the latch, in the slanted attitude maintained by the occupied vehicle when towed in the water at surfacing speed.

5. A single-rider, steerable, combined snow and water vehicle as set forth in claim 4 in which the seat has unitary with it a downwardly extending seat stem, an upstanding stationary supporting post interfitted with the seat stem and slidingly supporting the seat stem for up-and-down movement, compression spring means constantly urging the seat upward relative to the post and normally maintaining the seat at a substantially higher level than that which it assumes when occupied by a rider, the tow-retaining latch being pivoted on the supporting post for movement about a transversely extending axis and having a portion engageable within the seat stem, the construction and arrangement being such that the latch is rocked to, and maintained in, a tow-retaining position by downward movement of the stem when the seat stem is depressed by the weight of a rider on the seat, but is automatically shifted to a tow-releasing position in response to upward movement of the stem as the stem moves upward in response to relief of the rider's weight on the seat.

6. A single-rider, steerable, combined snow and water vehicle as set forth in claim 5 in which the interfitting parts of the seat post and the seat stem are, in part at least, of noncircular cross section, whereby turning of the seat is prevented by the post.

7. A single-rider, steerable, combined snow and water vehicle as set forth in claim 5, which further includes a transversely extending, body-reinforcing unit affixed to the wings and disposed just beneath the seat, said unit including handholds at opposite sides of the seat, said handholds adapted (a) to be alternatively pulled upward and thrust downward for steering purposes, (b) to be simultaneously thrust downward for reducing the rider's weight upon the seat and thereby releasing a towline while keeping the center of gravity of the rider low in the vehicle, (c) to be used one at a time or both together for carrying the vehicle, (d) to enable the rider to maintain a firm hold on the vehicle when riding it, and (e) to be jerked upward and twisted simultaneously for turning the vehicle sidewise abruptly, for snow-braking purposes.

8. A single-rider, steerable, combined snow and water vehicle as set forth in claim 7 in which means are provided for easy attachment of the seat assembly and the reinforcing unit to the body so that these is no need for attaching such assembly and unit to the body at the factory before shipment, and in which the sides of the vehicle flare outward from bottom to top, the construction and arrangement being such that a plurality of the vehicle bodies can be nested for shipment and can thereafter be united with their respective seat assemblies and reinforcing units by unskilled persons.

9. A single-rider, steerable, gliding, towable, water vehicle which comprises, in combination, a rider-carrying body, a raised seat means mounting said seat in the body with provision for up-and-down movement relative to the body, spring means interposed between the body and the seat and constructed and arranged to urge the unoccupied seat upward to a raised normal position relative to the body but to permit the seat to be depressed to a lower position by the weight of a rider, and a single tow latch connected to said seat-mounting means responsive to up-and-down movement of the seat and constructed and arranged to occupy a towline-retaining position so long as the seat is depressed to its lower position by the weight of a rider, but automatically shiftable to a tow-releasing position as the seat is moved upward in response to diminution of the weight borne by it.

10. A single-rider, steerable, gliding, towable, water vehicle as set forth in claim 9 in which the seat mounting comprises a hollow, upstanding post secured in fixed relation to the body, in the lower end of which post the spring is lodged, the seat including a slotted stem as a unitary part thereof, which stem has up-and-down sliding, interfitting relation with the post and rests upon the spring, and in which the latch is pivoted on the post and includes a tail portion which is received in the slotted portion of the stem when the seat is raised and the latch is ineffective, but which is cammed out of the slot to make the latch effective as the stem is depressed by the weight of the rider.

* * * * *

UNITED STATES PATENT OFFICE
CERTIFICATE OF CORRECTION

Patent No. 3,617,070              Dated November 2, 1971

Inventor(s)  Arthur C. Roberts

It is certified that error appears in the above-identified patent and that said Letters Patent are hereby corrected as shown below:

In the abstract, lines 4 and 5, cancel "All surface portions of the vehicle body to the right or left."; line 8, "s" should read -- as --. Column 2, line 45, "in" should read -- is --; line 72, after "When" insert -- in --. Column 3, line 19, "not" should read -- no --; line 21, "speed in" should read -- speed is --; line 35, "volts" should read -- bolts --. Column 4, line 2, "substantial" should read -- but --; line 30, "single-rider" should read -- said --. Column 5, line 4, "these" should read -- there --; line 13, after "raised seat" insert a comma.

Signed and sealed this 6th day of June 1972.

(SEAL)
Attest:

EDWARD M. FLETCHER, JR.                ROBERT GOTTSCHALK
Attesting Officer                       Commissioner of Patents